US009807068B1

(12) United States Patent
Golwalkar et al.

(10) Patent No.: US 9,807,068 B1
(45) Date of Patent: Oct. 31, 2017

(54) SECURE AUTHENTICATION OF DEVICES

(71) Applicant: Amazon Technologies, Inc., Seattle, WA (US)

(72) Inventors: Yogesh Vilas Golwalkar, Hyderabad (IN); Bharath Kumar Bhimanaik, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 14/563,095

(22) Filed: Dec. 8, 2014

(51) Int. Cl.
*H04L 9/32* (2006.01)
*H04L 29/06* (2006.01)

(52) U.S. Cl.
CPC ............ *H04L 63/068* (2013.01); *H04L 63/08* (2013.01); *H04L 63/10* (2013.01)

(58) Field of Classification Search
CPC ........ H04L 63/068; H04L 63/08; H04L 63/10
USPC .......................................................... 726/6
See application file for complete search history.

(56) References Cited

U.S. PATENT DOCUMENTS

| 2013/0167208 | A1* | 6/2013 | Shi | H04L 63/18 726/5 |
| 2013/0318346 | A1* | 11/2013 | Libonate | H04L 43/16 713/168 |
| 2014/0201730 | A1* | 7/2014 | Biswas | G06F 8/61 717/178 |
| 2014/0282961 | A1* | 9/2014 | Dorfman | H04L 63/0823 726/7 |
| 2015/0334108 | A1* | 11/2015 | Khalil | G06F 21/31 726/8 |

* cited by examiner

*Primary Examiner* — Baotran N To
(74) *Attorney, Agent, or Firm* — Thomas | Horstemeyer, LLP

(57) ABSTRACT

Disclosed are various embodiments for an authentication service. A unique identifier is associated with a device access token for a client to be authenticated. An authentication identifier is sent to an authenticated client. The client to be authenticated communicates the authentication identifier and unique identifier to the authentication service to complete authentication.

17 Claims, 6 Drawing Sheets

SECURE AUTHENTICATION OF DEVICES

BACKGROUND

Clients such as wearable devices may need to authenticate with a third-party service in order to communicate with or receive content from the third-party service. This authentication may be facilitated by a device authorization service, which controls access to the client by serving as an intermediary between the client and the third-party service. If the third-party service is compromised during authentication, this presents a risk to the third-party service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Clients such as wearable devices may be associated with a service provider that facilitates access to content by the client as well as access to the client by third-party services. For example, a service provider corresponding to a manufacturer, operating system developer, application distributor, or other service provider may serve as an intermediary for the client to the third-party services. A request by the client to authenticate with the third-party service may be redirected through the service provider. The service provider may then provide a device access token to the third-party service in exchange for an authentication token. The client may then access the third-party service using the authentication token, while the third-party service may push content to the client using the device access token. If the service provider becomes compromised during the authentication process discussed above, there is a risk that a malicious party may capture the service authentication token or the device access token, thereby putting the third-party service at risk for potential compromise.

An authentication service of the third-party service receives a request from the device authorization service to authenticate a first client with the third-party service. The authentication service generates a generic user identifier (GUID) and associates it with a device access token included in the request. In response to the request, the authentication service communicates the GUID to the device authorization service, which may then communicate the GUID to the first client. The authentication service then communicates an identifier corresponding an authentication state of a user account to a second client already authentication with the third-party service. The first client then captures an identifier and communicates the GUID and the identifier to the authorization service. If the GUID is still valid, the authorization service associates the corresponding device access token with the user account and communicates a service access token to the first client using the device access token.

In the following discussion, a general description of the system and its components is provided, followed by a discussion of the operation of the same.

Figure 1:
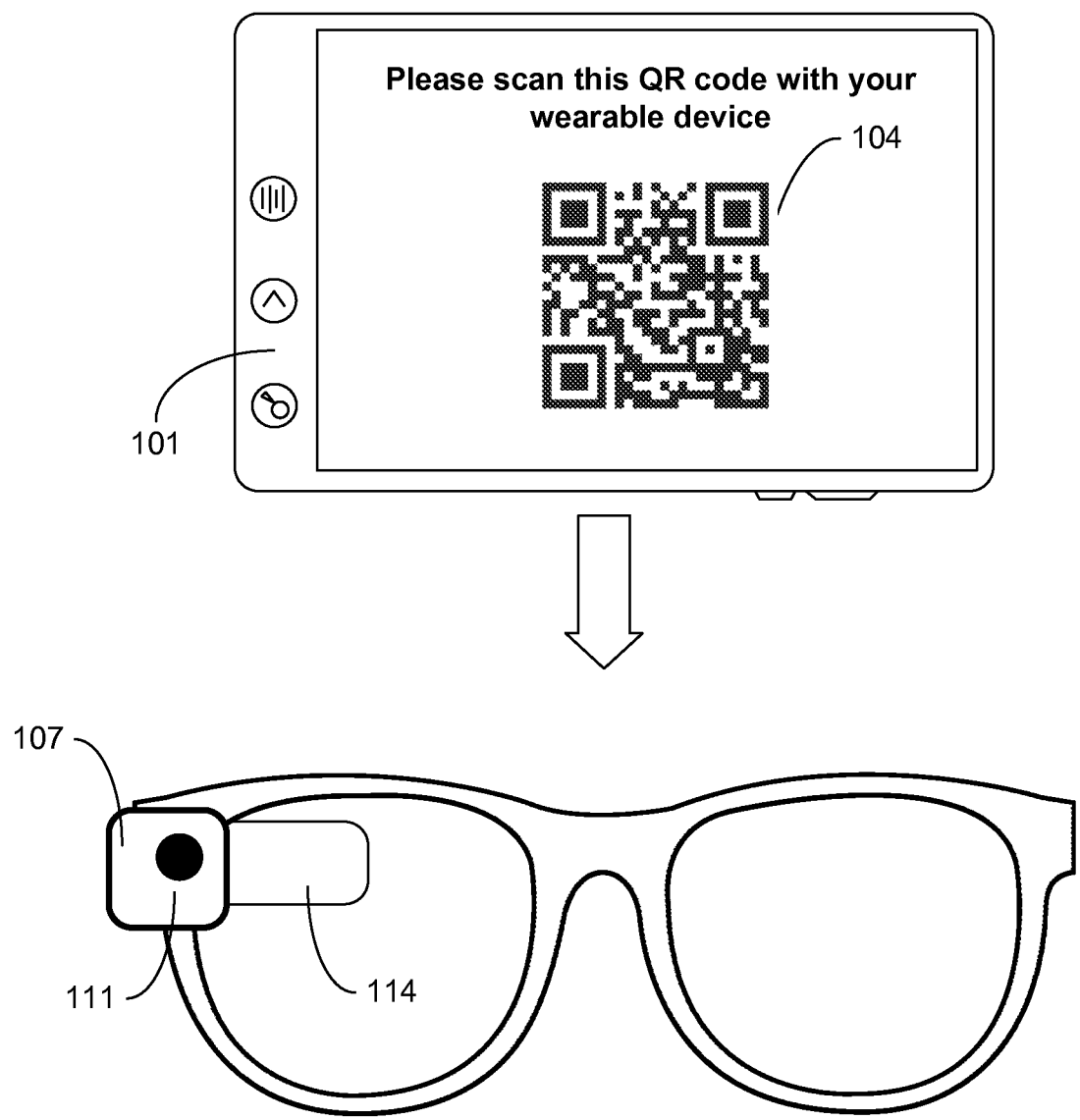
FIG. 1 is an example scenario according to various embodiments of the present disclosure.

Beginning with FIG. 1, shown is an example scenario depicting an authentication of a wearable client according to various embodiments of the present disclosure. Item 101 is a tablet client authenticated with a third-party service. The tablet client depicted in item 101 has received an authentication identifier encoded as a Quick Response (QR) code from the third-party service. The authentication identifier depicted in item 101 corresponds to an authentication state of the tablet client, indicating that the tablet client 101 has been successfully authenticated with the third-party service.

Item 107 is a wearable client to be authenticated with the third-party service. In this non-limiting example, the wearable client of item 107 is a component of a glasses frame. Item 111 is a camera sensor of the wearable client indicated by item 107, and item 114 is a display component of the wearable client. The QR code indicated by item 104 may be captured via the camera sensor of item 111. The wearable client of item 107 may then communicate the authentication identifier encoded by the QR code to the third-party service along with a unique identifier previously received from the third-party service. The third-party service may then authenticate the wearable client of item 107 with a user account corresponding to the authentication state of the authentication identifier.

Figure 2:
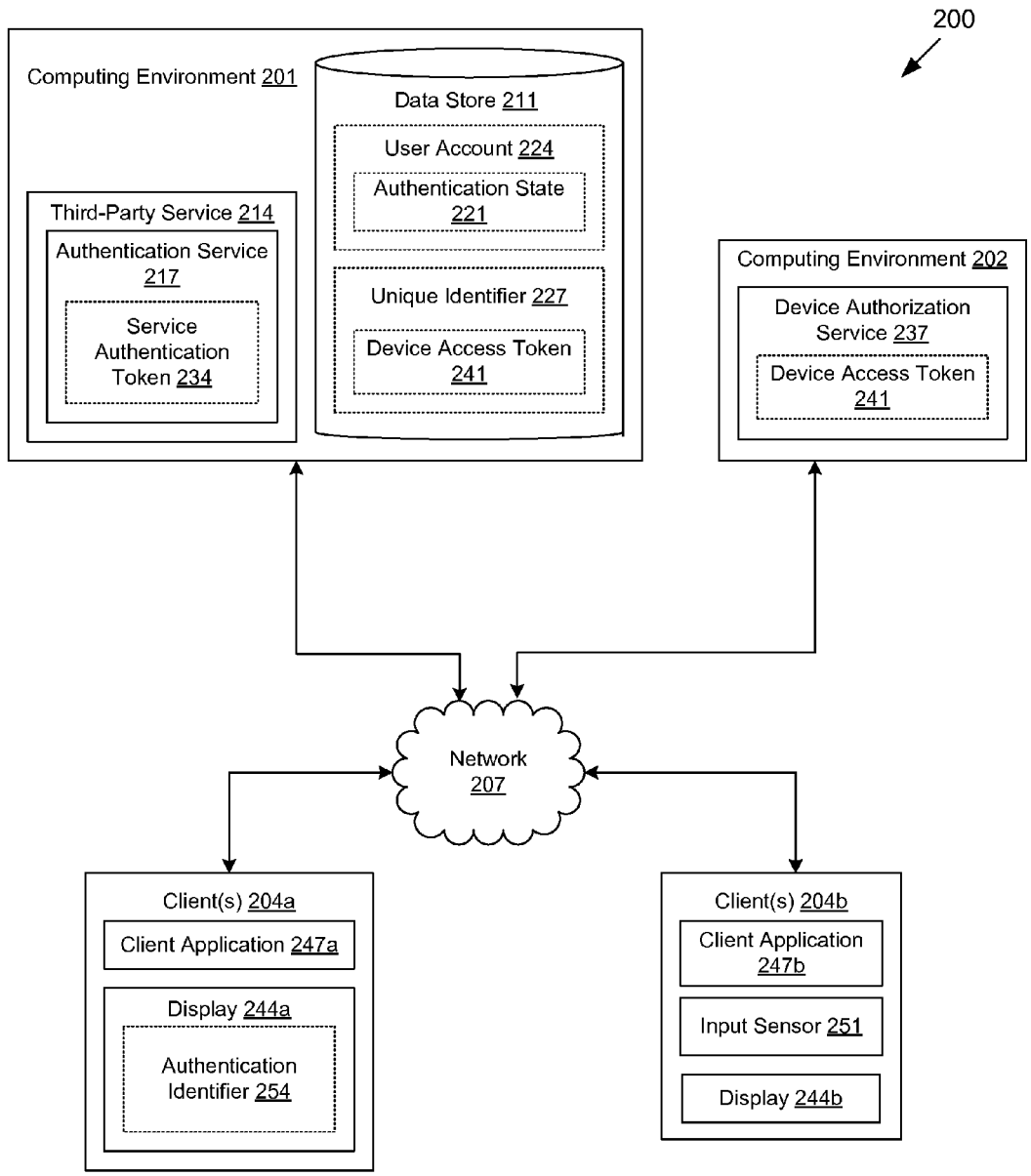
FIG. 2 is a drawing of a networked environment according to various embodiments of the present disclosure.

Moving on to FIG. 2, shown is a networked environment 200 according to various embodiments. The networked environment 200 includes computing environments 201/202, and clients 204a/b, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environments 201/202 may comprise, for example, a server computer or any other system providing computing capability. Alternatively, the computing environments 201/202 may employ a plurality of computing devices that may be arranged, for example, in one or more server banks or computer banks or other arrangements. Such computing devices may be located in a single installation or may be distributed among many different geographical locations. For example, the computing environments 201/202 may include a plurality of computing devices that together may comprise a hosted computing resource, a grid computing resource and/or any other distributed computing arrangement. In some cases, the computing environments 201/202 may correspond to an elastic computing resource where the allotted capacity of processing, network, storage, or other computing-related resources may vary over time.

Various applications and/or other functionality may be executed in the computing environments 201/202 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The components executed on the computing environment 201, for example, include a third-party service 214 having an authentication service 217, and other applications, services, processes, systems, engines, or functionality not discussed in detail herein. The third-party service 214 is executed to content, functionality, or other services to clients 204*a/b* via the network 207. To this end, the third-party service 214 may include an electronic commerce system, a media distribution service, an application distribution service, or other service as can be appreciated. The third-party service 214 may be configured to execute one or more services, processes, or machine instances to facilitate its operations. The authentication service 217 is executed to authenticate the client 204*b* with the third-party service 214 according to an authentication state 221 of the client 204*a*.

The data stored in the data store 211 includes, for example, user accounts 224, unique identifiers 227 stored against device access tokens 231, and potentially other data. User accounts 224 are collections of information to facilitate access to the third-party service 214. User accounts 224 may include, for example, login or authentication credentials, identifying information such as contact data, or other information. User accounts 224 may further indicate an authentication state 221 of one or more associated clients 204*a/b* that may access services or content provided by the third-party service 214 via the user account 224. The authentication state 221 indicates that a corresponding client 204*a/b* has been authenticated to access the third-party service 214 by providing valid authentication credentials, presenting a service authentication token 234, or otherwise authenticated. Unique identifiers 227 are reference identifiers for device access tokens 231 presented to the authentication service 217. Such unique identifiers 227 may conform to the Universally Unique Identifier (UUID) standard, and may include, for example, Globally Unique Identifiers (GUIDs), or other identifiers.

The components executed on the computing environment 202, for example, include a device authorization service 237, and other applications, services, processes, systems, engines, or functionality not discussed in detail herein. The device authorization service 237 is executed to facilitate the authentication of clients 204*b* with third-party services 214. For example, the device authorization service 237 may be configured to serve as an intermediary by redirecting communications between clients 204*b* and third-party services 214 during authentication, or other processes. To this end, the device authorization service 237 may be configured to provide device access tokens 241 to third-party services 214. The device access tokens 241 allow access by third-party services 214 to a client 204*b* corresponding to the device access token 241 for the purposes of pushing or installing content, or otherwise accessing the client 204*b*.

The clients 204*a/b* are representative of a plurality of client devices that may be coupled to the network 207. The clients 204*a/b* may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, wearable devices, or other devices with like capability. The clients 204*a/b* may include respective displays. The displays 244*a/b* may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The clients 204*a/b* may be configured to execute various applications such as a client application 247*a/b* and/or other applications. The client application 247*a/b* may be executed in a respective client 204 *a/b*, for example, to access network content served up by the computing environments 201/202 and/or other servers. To this end, the client applications 247*a/b* may comprise, for example, a browser, a dedicated application, etc. The clients 204*a/b* may be configured to execute applications beyond the client application 247*a/b* such as, for example, email applications, social networking applications, word processors, spreadsheets, and/or other applications.

The client 204*b* may also include one or more input sensors 251 to capture and encode images, sounds, or other information for processing by the client 204*b*. To this end, the input sensor 251 may include, for example, a camera capable of capturing still-frame images, video, or other visual data. The input sensor 251 may also include a microphone or other audio input device capable of capturing and encoding audio data for processing by the client 204*b*. The input sensor 251 may also be capable of other inputs or functionality as can be appreciated.

Next, a general description of the operation of the various components of the networked environment 200 is provided. To begin, a client 204*b* may communicate a request via the client application 247*b* to the device authorization service 237 to authenticate the client 204*b* with the third-party service 214. In response to this request, the device authorization service 237 may then forward or otherwise redirect the request to the authentication service 217 of the third-party service 214. This may include forwarding a device access token 241 to the authentication service 217 along with the request.

After receiving the device access token 241 and the request to authenticate the client 204*b*, the authentication service 217 may generate a unique identifier 227 and store the unique identifier 227 against the received device access token 241. In such an embodiment, the unique identifier 227 may be stored independent of user accounts 224 of the third-party service 214. Additionally, in some embodiments, the unique identifier 227 may be associated with a time limit or predefined time duration after the unique identifier 227 is generated. In such an embodiment, the authentication service 217 may be configured to deny authentication to clients 204*b* submitting the unique identifier 227 for authentication, as will be described in more detail below. In other embodiments, the authentication service 217 may be configured to regenerate the unique identifier 227 after expiration of the time limit or predefined duration. This may include disassociating the expired unique identifier 227 from the device access token 241 and associating the regenerated unique identifier 227 with the device access token 241 instead.

In some embodiments, the device authorization service 237 may be configured to receive a response from the authentication service 217 in response to the request and the device access token 241. For example, a protocol or policy implemented by the device authorization service 237 may indicate that a third-party service 214 should communicate a service authentication token 234 to the device authorization service 237 for forwarding to the client 204b. The service authentication token 234 may then be presented to the third-party service 214 by the client 204b to access functionality or content provided by the third-party service 214. However, instead of communicating the service authentication token 234, the authorization service 217 may communicate the unique identifier 227 corresponding to the received device access token 241 to the device authorization service 237. This allows for the device authorization service 237 to receive a response for forwarding to the client 204b, but allows the authentication service 217 to avoid sending the service authentication token 234 via the device authorization service 237. In doing so, this prevents the risk of the service authentication token 234 from being maliciously accessed should the device authorization service 237 or an associated communications channel become compromised.

Upon receiving the unique identifier 227 in response to the request and device access token 241, the device authorization service 237 forwards the unique identifier 227 to the client 204b. Next, a client 204a communicates a request to the third-party service 214 indicating that the client 204b should be authenticated with the user account 224. In some embodiments, the client 204a may be associated with an authentication state 221 of the user account 224 upon communication of the request. For example, the client 204a may have previously provided valid authentication credentials, login information, service authentication tokens 234, or other data to the authentication service 217, resulting in an authentication state 221 indicating the client 204a as being authorized to access the third-party service 214 via the user account 224.

In other embodiments, the client 204a may not be associated with an authentication state 221 the request to authenticate the client 204b with the user account 224 is communicated. In such an embodiment, the authentication service 217 may redirect the client 204a to a login page or otherwise solicit credentials in order to authenticate the client 204a.

In response to the request to authenticate the client 204b, the authentication service 217 communicates an authentication identifier 254 to the authenticated client 204a indicating the authentication state 221 of the client 204a. In some embodiments, the authentication identifier 254 may be determined based on the unique identifier 227, determined as corresponding to the unique identifier 227, or otherwise determined. For example, in some embodiments, the unique identifier 227 may comprise a public key, while the authentication identifier 254 comprises a corresponding private key. The authentication identifier 254 may also be determined by another approach. The authentication identifier 254 may be encoded as, for example, a Quick Response (QR) code, bar code, or other visual encoding. The authentication identifier 254 may also be encoded as an alphanumeric string, or other string encoding. The authentication identifier 254 may further be encoded as audio data, or otherwise encoded.

After receiving the authentication identifier 254, the client 204a may render the encoding of the authentication identifier 254 on the display 244a. This may include, for example, rendering a depiction of the QR code, bar code, string encoding, or other depiction of the authentication identifier 254. In other embodiments, the client 204a may play or otherwise emit an audio encoding of the authentication identifier 254. In further embodiments, the client 204a may begin a communication of the authentication identifier 254 via a communications channel accessible to the client 204b. This may include, for example, emitting a near-field communication (NFC) signal, infrared (IR) signal, or other signal embodying the authentication identifier 254. This may also include communicating the authentication identifier 254 via a wireless network connection, personal area network connection, push channel, or other communications channel.

Next, the client 204b captures or obtains the authentication identifier 254 from the client 204a. This may include, for example, capturing a video or visual encoding of the authentication identifier 254 via a camera input sensor 251. This may also include capturing an audio encoding of the authentication identifier 254 via a microphone or other audio input sensor 251. This may further include obtaining the authentication identifier via a network interface accessing a communications channel between the clients 204a/b, such as a wireless network interface, NFC interface, personal area network interface, or another interface.

After receiving the authentication identifier 254 from the client 204a, the client 204b communicates the authentication identifier 254 and the unique identifier 227 to the authentication service 217. The authentication service 217 may then determines if the unique identifier 227 is still valid. For example, this may include determining if a time limit or other predefined duration threshold of the unique identifier 227 has not yet expired. As another example, this may also include determining of the unique identifier 227 has been previously submitted to the authentication service 217. The authentication service 217 may also determine if the unique identifier 227 is valid by another approach.

In some embodiments, the authentication service 217 may also determine if the authentication identifier 254 is valid. For example, the authentication service 217 may compare the received authentication identifier 254 to the authentication identifier 254 for the authentication state 221 of the user account 224 with which the client 204b is to be associated. The authentication service may also determine if the authentication identifier 254 is valid by another approach.

After receiving a valid unique identifier 227 and authentication identifier 254, the authentication service 217 communicates a service authentication token 234 to the client 204b. This may include, for example, communicating the service authentication token 234 to the client 204b using functionality facilitated by the device access token 241, such as a content push, a remote installation, or another function. The client 204b may then use the service authentication token 234 to access content and services provided by the third-party service 214.

Figure 3:
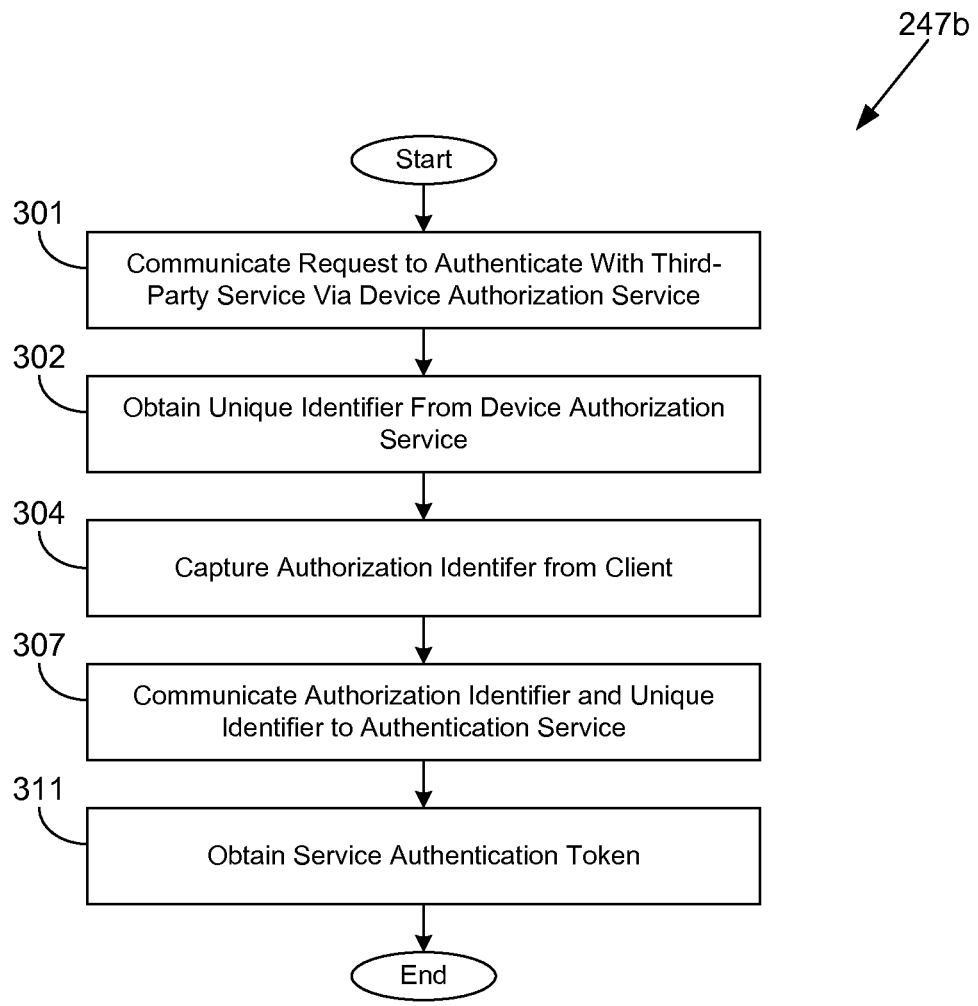
FIG. 3 is a flowchart illustrating one example of functionality implemented as portions of a client application executed in a client in the networked environment of FIG. 2 according to various embodiments of the present disclosure.

Referring next to FIG. 3, shown is a flowchart that provides one example of the operation of a portion of the client application 247b according to various embodiments. It is understood that the flowchart of FIG. 3 provides merely an example of the many different types of functional arrangements that may be employed to implement the operation of the portion of the client application 247b as described herein. As an alternative, the flowchart of FIG. 3 may be viewed as depicting an example of elements of a method implemented in the client 204b (FIG. 2) according to one or more embodiments.

Beginning with box 301, the client application 247b communicates a request to authenticate the client 204b with the third-party service 214 (FIG. 2) by forwarding the request via the device authorization service 237 (FIG. 2). In some embodiments, the request communicated by the client application 247*b* may include a device access token 241 (FIG. 2) for the client 204*b*. In other environments, the device access token 241 may be forwarded to the third-party service 214 by the device authorization service 237 with the request.

Next, in box 302, the client application 247*b* receives, in response to the request, a unique identifier 227 (FIG. 2) generated by the third-party service 214. After receiving the unique identifier 227, in box 302, the client application 247*b* obtains an authentication identifier 254 (FIG. 2) from a client 204*a* (FIG. 2) having an authentication state 221 (FIG. 2) for the third-party service 214. The authentication state 221 indicates that the client 204*a* has been authenticated with the third-party service 214 via a user account 224 (FIG. 2).

Obtaining the authentication identifier 254 may include capturing a QR code, bar code, or other visual encoding of the authentication identifier 254 rendered on a display 244*a* (FIG. 2) of the client 204*a* using a camera input sensor 251 (FIG. 2). Obtaining the authentication identifier 254 may also include applying a text recognition algorithm to a string encoding of the authentication identifier 254 rendered on the display 244*a* of the client 204*a* using the camera input sensor 251. The authentication identifier 254 may also be obtained by capturing an audio encoding of the authentication identifier 254 played by the client 204*a* using an audio input sensor 251.

In other embodiments, obtaining the authentication identifier 254 may be performed via a communications channel between the client 204*a* and the client 204*b*. For example, the authentication identifier 254 may be obtained via an NFC connection, a wireless network connection, a personal area network connection, a push channel, an infrared signal, or other communications channel between the client 204*a* and 204*b*. The authentication identifier 254 may also be obtained by another approach.

After obtaining the authentication identifier 254, the client application 247*b* communicates the authentication identifier 254 and the unique identifier 227 to the third-party service 214. In response, the client application 247*b* obtains a service authentication token 234 (FIG. 2) from the third-party service 214, after which the process ends.

Figure 4:
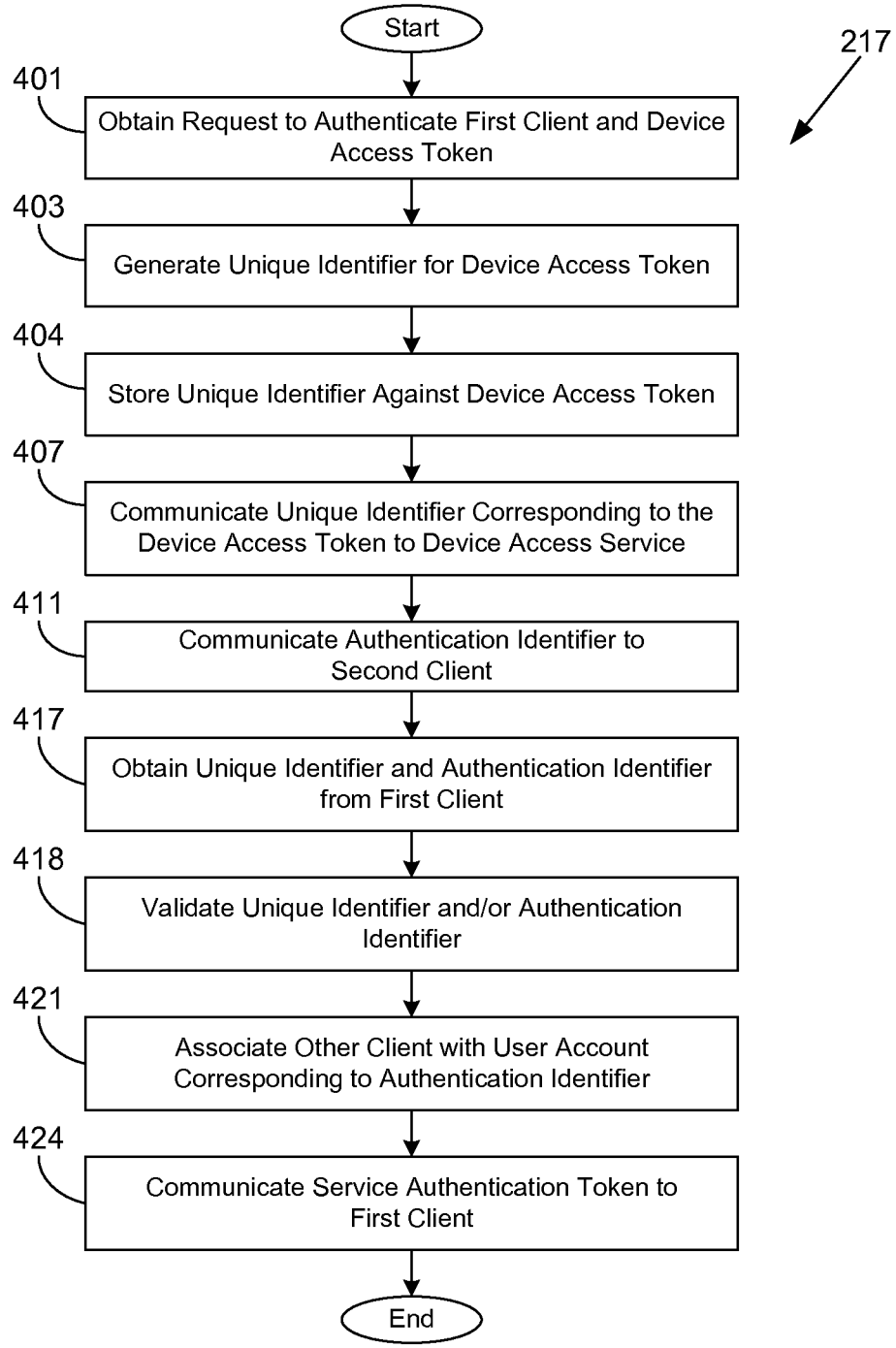
FIG. 4 is a flowchart illustrating one example of functionality implemented as portions of an authentication service executed in a computing environment in the networked environment of FIG. 2 according to various embodiments of the present disclosure.

Referring next to FIG. 4, shown is a flowchart that provides one example of the operation of a portion of the authentication service 217 according to various embodiments. It is understood that the flowchart of FIG. 4 provides merely an example of the many different types of functional arrangements that may be employed to implement the operation of the portion of the authentication service 217 as described herein. As an alternative, the flowchart of FIG. 4 may be viewed as depicting an example of elements of a method implemented in the computing environment 201 (FIG. 2) according to one or more embodiments.

Beginning with box 401, the authentication service 217 obtains a request from a device authorization service 237 (FIG. 2) to authenticate a client 204*b* (FIG. 2) with a third-party service 214 (FIG. 2). The request may be forwarded or redirected from the client 204*b* by the device authorization service 237. The authentication service 217 also obtains a device access token 241 (FIG. 2) from the device authorization service 237, granting a level of access to the client 204*b* by the third-party service 214. The device access token 241 may be included in the request or communicated separately from the request.

Next, in box 403, the authentication service 217 generates a unique identifier 227 (FIG. 2) for the device access token 241. The unique identifier 227 may be generated according to the universally unique identifier (UUID) standard. Accordingly, the unique identifier 227 may include a Globally Unique Identifier (GUID), or another UUID-compliant identifier. The unique identifier 227 may also include a pseudorandom identifier, or another identifier.

In some embodiments, the unique identifier 227 may be associated with an expiration date, time limit, predefined time duration, or other temporal limitation. In such an embodiment, generating the unique identifier 227 may include determining the associated temporal limitation. Accordingly, in some embodiments, the authentication service 217 may be configured to periodically regenerate the unique identifier 227 on expiration of the temporal limitation.

After generating the unique identifier 227, in box 404, the authentication service 217 stores the unique identifier 227 against the device access token 241 obtained from the device authorization service 237. This may include, for an example, storing an entry in a data store 211 associating the unique identifier 227 and the device access token 241. The unique identifier 227 may be stored against the device access token 241 but independent of user accounts 224 (FIG. 2) of the third-party service 214.

In response to the request and the device access token 241, in box 407, the authentication service 217 communicates the unique identifier 227 to the device authorization service 237 for forwarding to the client 204*b* corresponding to the device access token 241. In box 411, the authentication service 217 then communicates an authentication identifier 254 (FIG. 2) to a client 204*a* (FIG. 2). The client 204*a* has an authentication state 221 (FIG. 2) with respect to the third-party service 214 indicating that the client 204*a* is authenticated for purposes of accessing the third-party service 214. For example, the client 204*a* may have communicated login credentials or other identifying information corresponding to a user account 224 of the third-party service 214. As another example, the client 204*a* may have provided a service authentication token 234 to the authentication service 217. The client 204*a* may also have been otherwise authenticated. The authentication identifier 254 indicates the authentication state 221 of the client 204*a*.

Communicating the authentication identifier 254 may include encoding the authentication identifier 254 as a QR code, a bar code, or another visual encoding. Communicating the authentication identifier 254 may also include encoding the authentication identifier 254 an audio encoding, string encoding, or another encoding. The authentication identifier 254 may also be included by another approach.

Next, in box 417, the authentication service 217 obtains a unique identifier 227 and authentication identifier 254 from the client 204*b*. In some embodiments, the unique identifier 227 and authentication identifier 254 may be based on an encryption scheme, or other cryptographic approach. For example, the unique identifier 227 may correspond to a public key, while the authentication identifier 254 may correspond to a private key. The authentication service 217 then validates the obtained unique identifier 227 and authentication identifier 254 in box 418. This may include, for example, determining if the obtained unique identifier 227 and/or obtained authentication identifier 254 had been previously obtained from another client 204*b*. This may also include determining if a time limit, expiration time, time-to-live, or other temporal limitation of the obtained unique identifier 227 has expired or otherwise been violated. This may also include determining if the obtained authentication identifier 254 corresponds to an authentication state 221 of an authenticated user account 224. The unique identifier 227 and authentication identifier 254 may also be validated by another approach.

After validating the unique identifier 227 and authentication identifier 254, in box 424, the authentication service 217 communicates a service authentication token 234 (FIG. 2) to the client 204b. The client 204b may then use the service authentication token 234 to access content or services of the third-party service 214 via the user account 224. After communicating the service authentication token 234, the process ends.

Figure 5:
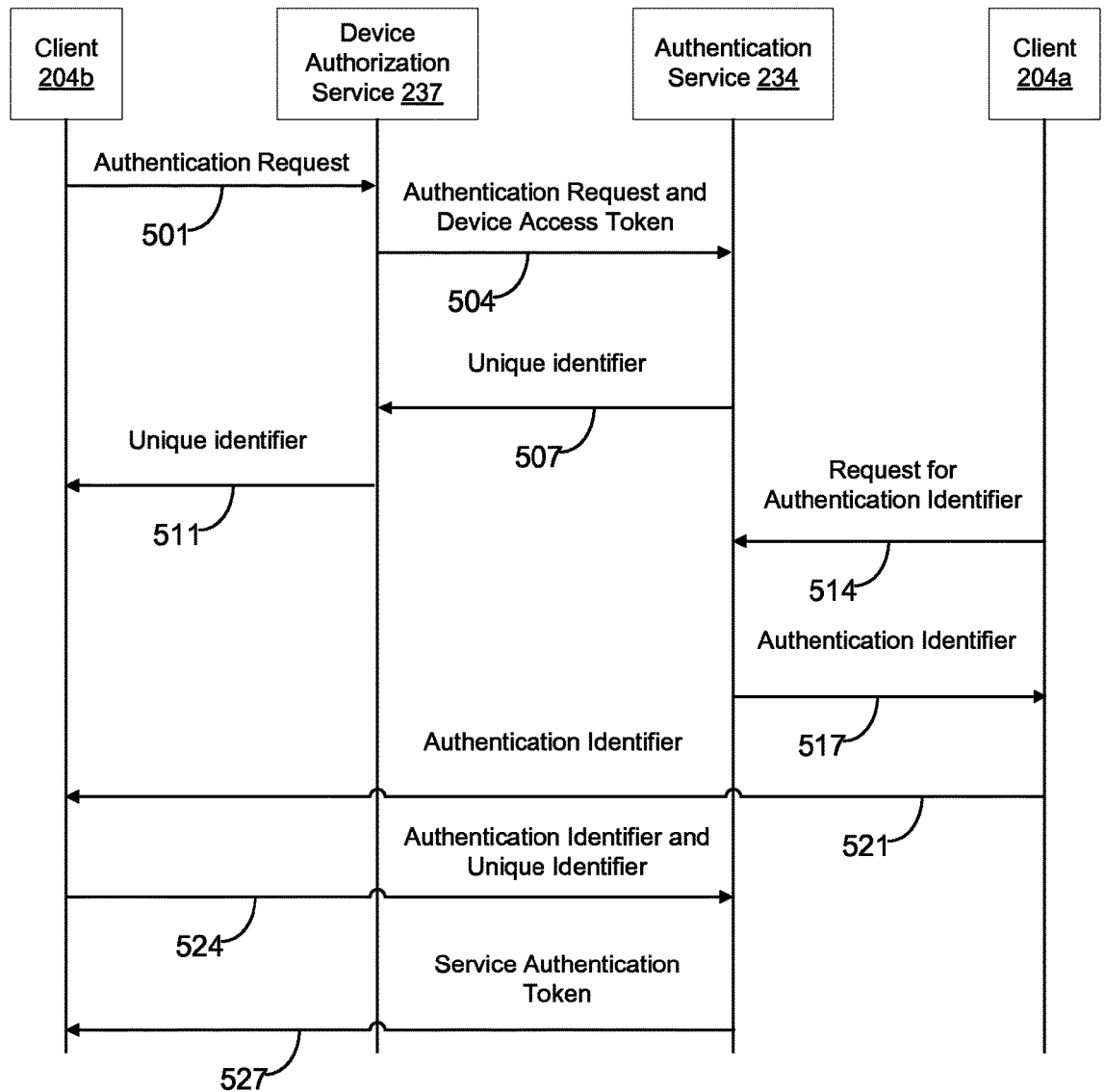
FIG. 5 is a communications diagram describing portions of functionality implemented in the networked environment of FIG. 2 according to various embodiments of the present disclosure.

Turning now to FIG. 5, shown is a communications diagram that provides one example of the operation of a portion of the networked environment 200 according to various embodiments. It is understood that the communications diagram of FIG. 5 provides merely an example of the many different types of functional arrangements that may be employed to implement the networked environment 200 as described herein. As an alternative, the communications diagram of FIG. 5 may be viewed as depicting an example of elements of a method implemented in the computing environment 201 (FIG. 2) according to one or more embodiments.

Beginning with time 501, a client 204b communicates a request to authenticate the client 204b with a third-party service 214 (FIG. 2). To this end, the authentication request is communicated first to a device authorization service 237. At time 504, the device authorization service 237 forwards the authentication request to the authentication service 217 of the third-party service 214 with a device access token 241 (FIG. 2) corresponding to the client 204b. In response to the request, at time 507, the authentication service 217 returns to the device authorization service 237 a unique identifier 227 (FIG. 2) corresponding to the received device access token 241. At time 511, the device authorization service 237 communicates the unique identifier 227 to the client 204b.

Next, at time 514, the client 204a communicates a request for an authentication identifier 254 (FIG. 2) from the authentication service 217. In this example, it is assumed that the client 204a had been authenticated with the authentication service 217 prior to or contemporaneous to time 514, and therefore has an authentication state 221 (FIG. 2) indicating that the client 204a is authenticated. Therefore, the requested authentication identifier 254 corresponds to the authentications state 221 of the client 204a. In response to the request, the authentications service 217 communicates the authentication identifier 254 to the client 204a at time 521.

Next, at time 524, the client 204b then captures the authentication identifier 254 from the client 204a, as was described previously. The client 204b then communicates both the unique identifier 227 and authentication identifier 254 to the authentication service 217. After validating the unique identifier 227 and the authentication identifier 254, the authentication service 217 then communicates a service authentication token 234 (FIG. 2) to the client 204b.

It is understood that one or more of the actions described above as being performed by the client 204b may be performed by the client 204a. For example, at time 501, the client 204b is described as communicating a request to authenticate the client 204b with the third-party service 214. In some embodiments, the client 204a may communicate the request to authenticate the client 204b with the third-party service 214. Other functionality of the client 204b may also be performed by the client 204a as can be appreciated.

Furthermore, it is understood that, while the discussion presented above describes a unique identifier 227 communicated to the client 204b and the authentication identifier 254 communicated to the client 204a, it is understood that in some embodiments the unique identifier 227 may be communicated to the client 204a while the authentication identifier 254 is communicated to the client 204b. In such an embodiment, the client 204b would then be configured to obtain the unique identifier 227 from the client 204a as was described above with respect to time 521, or by another approach.

Figure 6:
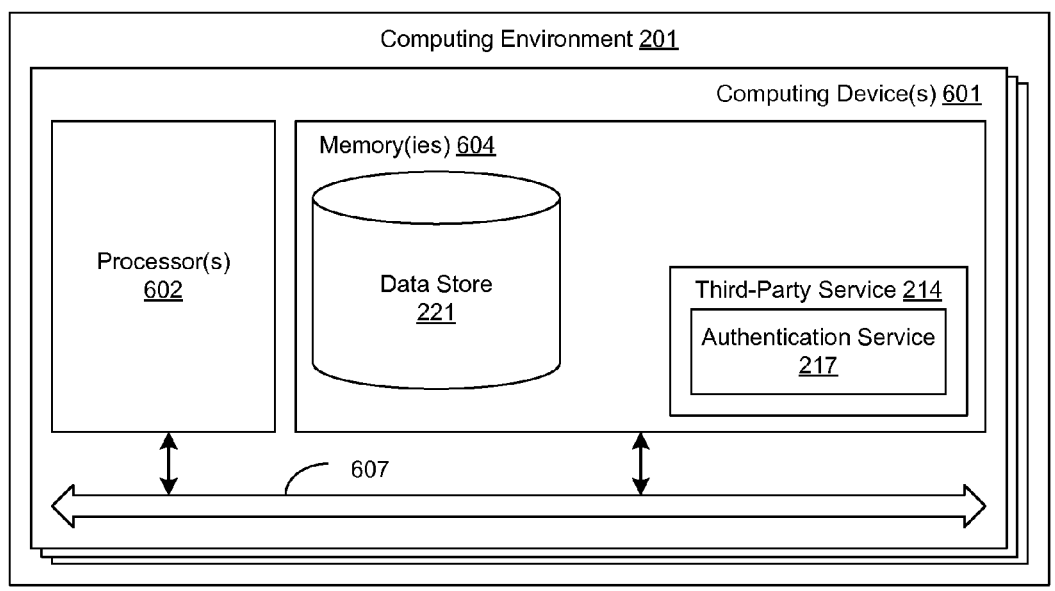
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 201 according to an embodiment of the present disclosure. The computing environment 201 includes one or more computing devices 601. Each computing device 601 includes at least one processor circuit, for example, having a processor 602 and a memory 604, both of which are coupled to a local interface 607. To this end, each computing device 601 may comprise, for example, at least one server computer or like device. The local interface 607 may comprise, for example, a data bus with an accompanying address/control bus or other bus structure as can be appreciated.

Stored in the memory 604 are both data and several components that are executable by the processor 602. In particular, stored in the memory 604 and executable by the processor 602 are third-party service 214 having the authentication service 217, and potentially other applications. Also stored in the memory 604 may be a data store 211 and other data. In addition, an operating system may be stored in the memory 604 and executable by the processor 602.

It is understood that there may be other applications that are stored in the memory 604 and are executable by the processor 602 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 604 and are executable by the processor 602. In this respect, the term "executable" means a program file that is in a form that can ultimately be run by the processor 602. Examples of executable programs may be, for example, a compiled program that can be translated into machine code in a format that can be loaded into a random access portion of the memory 604 and run by the processor 602, source code that may be expressed in proper format such as object code that is capable of being loaded into a random access portion of the memory 604 and executed by the processor 602, or source code that may be interpreted by another executable program to generate instructions in a random access portion of the memory 604 to be executed by the processor 602, etc. An executable program may be stored in any portion or component of the memory 604 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 is defined herein as including both volatile and nonvolatile memory and data storage components. Volatile components are those that do not retain data values upon loss of power. Nonvolatile components are those that retain data upon a loss of power. Thus, the memory 604 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 602 may represent multiple processors 602 and/or multiple processor cores and the memory 604 may represent multiple memories 604 that operate in parallel processing circuits, respectively. In such a case, the local interface 607 may be an appropriate network that facilitates communication between any two of the multiple processors 602, between any processor 602 and any of the memories 604, or between any two of the memories 604, etc. The local interface 607 may comprise additional systems designed to coordinate this communication, including, for example, performing load balancing. The processor 602 may be of electrical or of some other available construction.

Although the authentication service 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the client application 247 and the authentication service 217. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 602 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the client application 247 and the authentication service 217, that comprises software or code can be embodied in any non-transitory computer-readable medium for use by or in connection with an instruction execution system such as, for example, a processor 602 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the client application 247 and the authentication service 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 601, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A system, comprising:
at least one computing device; and
a device authentication service executed in the at least one computing device, the device authentication service causing the at least one computing device to at least:
associate a device access token with a unique identifier and a user account;
communicate an authentication identifier corresponding to the unique identifier to a first client device, the first client device being authenticated with the user account, wherein the authentication identifier is associated with an authentication state of the user account and the first client device is configured to provide the authentication identifier to a second client device in a quick response (QR) code;
associate the user account with the second client device in response to obtaining the authentication identifier and the unique identifier from the second client device, wherein the second client device captures the authentication identifier from the first client device via a camera integrated within the second client device; and
communicate the device access token to the second client device, wherein the device access token is used by the second client device to authenticate access to a third party service.

2. The system of claim 1, wherein the device authentication service further causes the at least one computing device to communicate the unique identifier to a device authentication service in response to obtaining the device access token from the device authentication service.

3. The system of claim 1, wherein the device access token facilitates a communication of content to the second client device.

4. The system of claim 1, wherein the unique identifier comprises a Globally Unique Identifier (GUID).

5. The system of claim 1, wherein the user account is one of at least one user account, and wherein the device access token is associated with the unique identifier by storing the device access token and the unique identifier independent of the at least one user account.

6. The system of claim 1, wherein the unique identifier is associated with an expiration time, and wherein the user account is associated with the second client device in response to obtaining the authentication identifier and the unique identifier within the expiration time.

7. The system of claim 5, wherein the unique identifier is a first unique identifier, and the device authentication service further causes the at least one computing device to at least:
disassociate the device access token and the first unique identifier in response to a passage of the expiration time; and
associate the device access token with a second unique identifier.

8. A method, comprising:
associating a device access token with a unique identifier and a user account;
communicating an authentication identifier corresponding to the unique identifier to a first client device, the first client device being authenticated with the user account, wherein the authentication identifier is associated with an authentication state of the user account and the first client device is configured to provide the authentication identifier to a second client device in a quick response (QR) code;
associating the user account with the second client device in response to obtaining the authentication identifier and the unique identifier from the second client device, wherein the second client device captures the authentication identifier from the first client device via a camera integrated within the second client device; and
communicating the device access token to the second client device, wherein the device access token is used by the second client device to authenticate access to a third party service.

9. The method of claim 8, further comprising communicating the unique identifier to a device authentication service in response to obtaining the device access token from the device authentication service.

10. The method of claim 8, wherein the device access token facilitates a communication of content to the second client device.

11. The method of claim 8, wherein the unique identifier comprises a Globally Unique Identifier (GUID).

12. The method of claim 8, wherein the user account is one of at least one user account, and wherein the logic that associates the device access token with the unique identifier further comprises logic that stores the device access token and the unique identifier independent of the at least one user account.

13. The method of claim 8, wherein the unique identifier is associated with an expiration time, and wherein the user account is associated with the second client device in response to obtaining the authentication identifier and the unique identifier within the expiration time.

14. The method of claim 13, wherein the unique identifier is a first unique identifier, and the method further comprises:
disassociating the device access token and the first unique identifier in response to a passage of the expiration time; and
associating the device access token with a second unique identifier.

15. A non-transitory computer-readable medium embodying a program executable in at least one computing device, the program, when executed, causing the at least one computing device to at least:
associate a device access token with a unique identifier and a user account;
communicate an authentication identifier corresponding to the unique identifier to a first client device, the first client device being authenticated with the user account, wherein the authentication identifier is associated with an authentication state of the user account and the first client device is configured to provide the authentication identifier to a second client device in a quick response (QR) code;
associate the user account with the second client device in response to obtaining the authentication identifier and the unique identifier from the second client device, wherein the second client device captures the authentication identifier from the first client device via a camera integrated within the second client device; and
communicate the device access token to the second client device, wherein the device access token is used by the second client device to authenticate access to a third party service.

16. The non-transitory computer-readable medium of claim 15, wherein the program further communicates the unique identifier to a device authentication service in response to obtaining the device access token from the device authentication service.

17. The non-transitory computer-readable medium of claim 15, wherein the device access token facilitates a communication of content to the second client device.

* * * * *